United States Patent [19]

Muddiman

[11] 4,141,171

[45] Feb. 27, 1979

[54] FISH LURE

[75] Inventor: Robert C. Muddiman, Middletown, Ohio

[73] Assignee: Waller B. Hunt, Middletown, Ohio

[21] Appl. No.: 781,508

[22] Filed: Mar. 25, 1977

[51] Int. Cl.² .................................................. A01K 85/00
[52] U.S. Cl. ...................................... 43/42.47; 43/42.39
[58] Field of Search .................. 43/42.47, 42.22, 42.5, 43/42.23, 42.39, 42.45, 42.48, 42

[56] References Cited

U.S. PATENT DOCUMENTS

| | | | |
|---|---|---|---|
| 2,437,549 | 3/1948 | Pecher | 43/42.39 |
| 2,563,282 | 8/1951 | Schenck | 43/42.22 |
| 2,615,274 | 10/1952 | Slough | 43/42.22 |
| 3,126,661 | 3/1964 | Phillips | 43/42.39 |
| 3,541,718 | 11/1970 | Norman | 43/42.47 |
| 3,762,088 | 10/1973 | Bainton | 43/42.5 |
| 3,874,109 | 4/1975 | Peterson | 43/42.22 |

Primary Examiner—Al Lawrence Smith
Assistant Examiner—Roscoe V. Parker
Attorney, Agent, or Firm—Thomas J. Slone

[57] ABSTRACT

A buoyant fish lure which is so configured that it can be caused to jump generally upwardly from a body of water in which it is floating by suddenly applying a generally forwardly acting force to the lure via a fish line rig. The lure has a wing lip which is cantilevered forwardly and upwardly from the bottom of a blunt nosed body. The wing lip functions to resolve a substantial portion of a forwardly acting force or force impulse into a vertical component which causes the lure to respond upwardly whereby, if the vertical force component is great enough, the lure is caused to jump from the water. Several alternate embodiments of the invention are shown in the figures and described in the specification.

14 Claims, 23 Drawing Figures

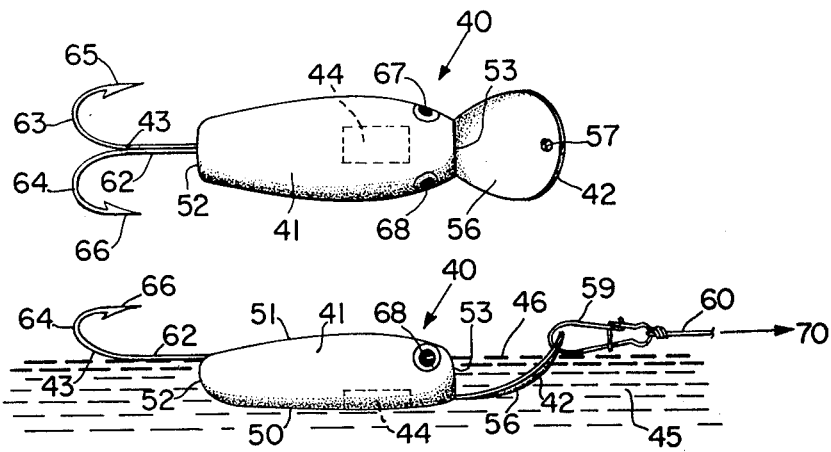
Fig. 1
Fig. 2
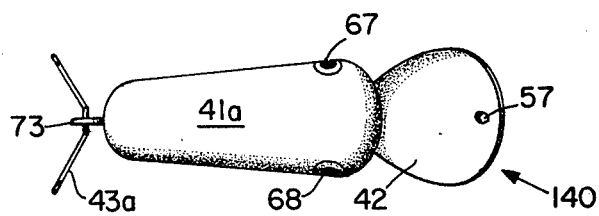
Fig. 3
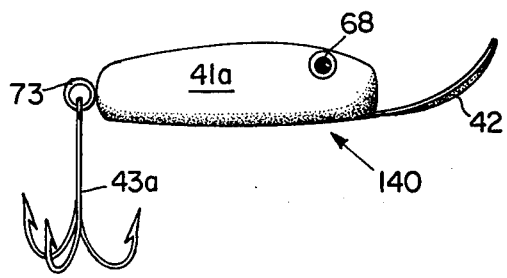
Fig. 4
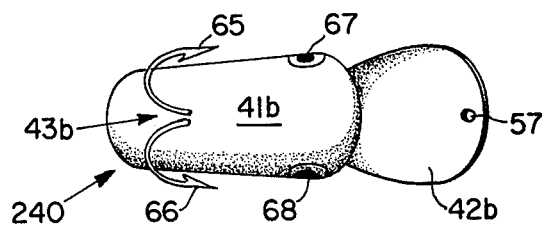
Fig. 5
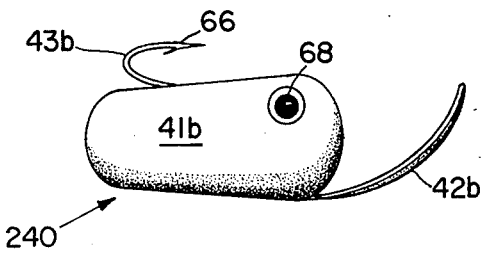
Fig. 6

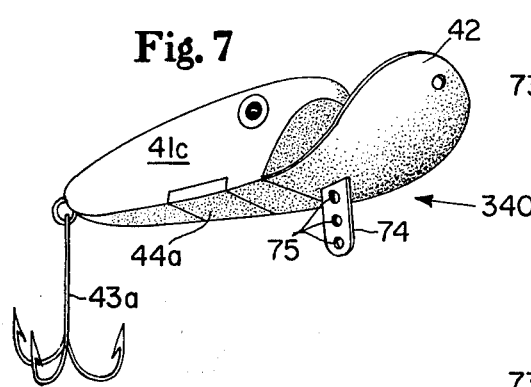
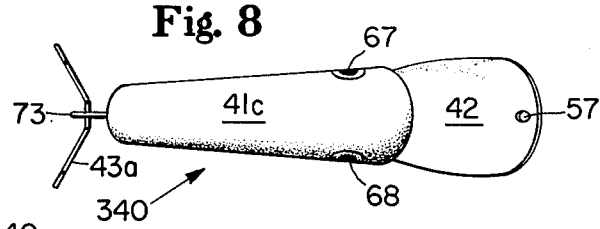
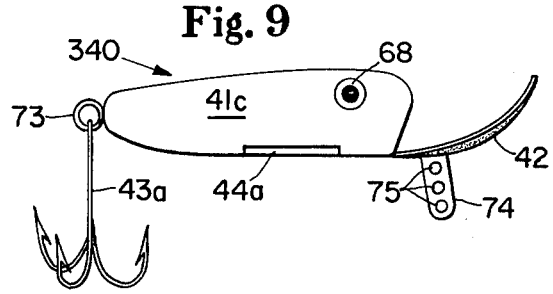
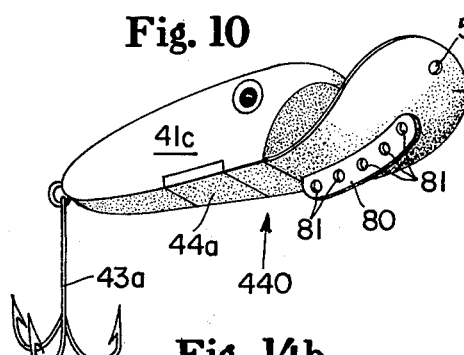
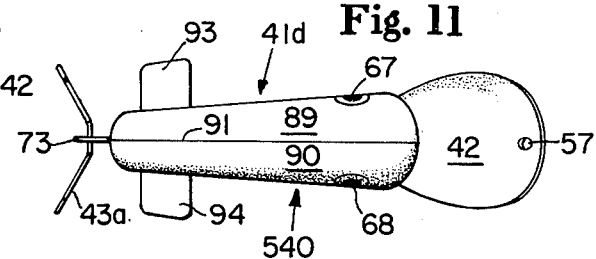
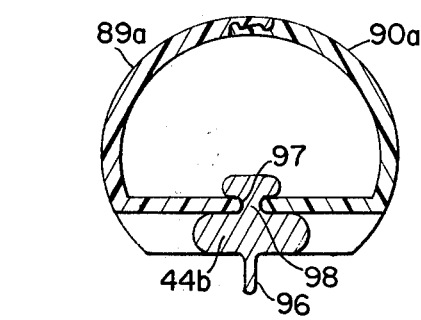
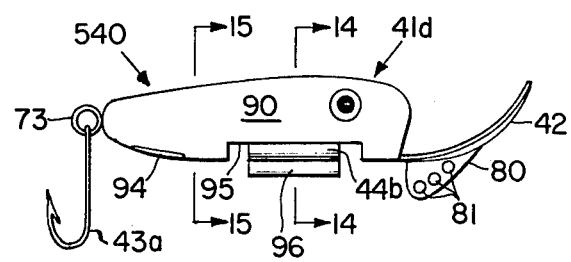
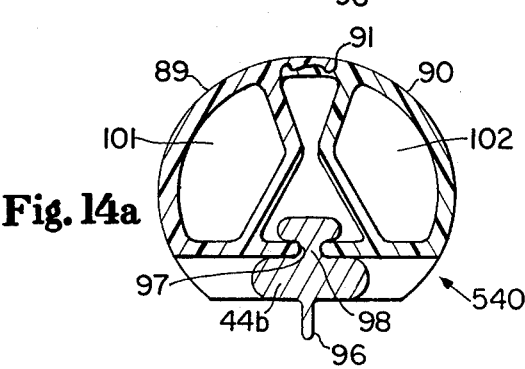
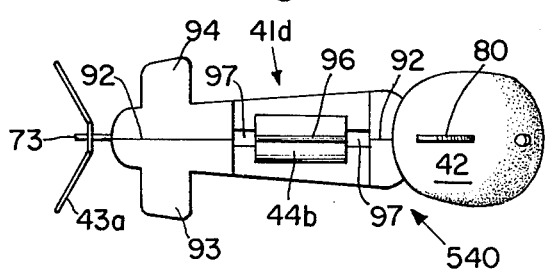

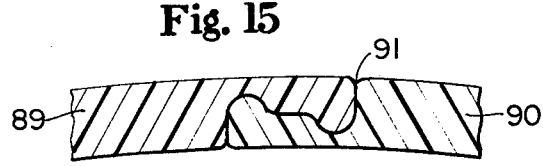
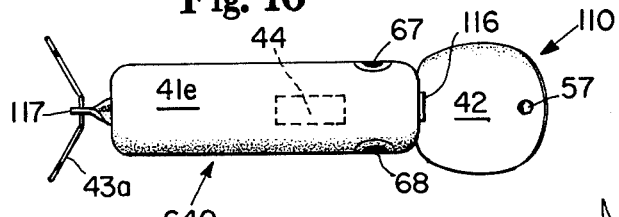
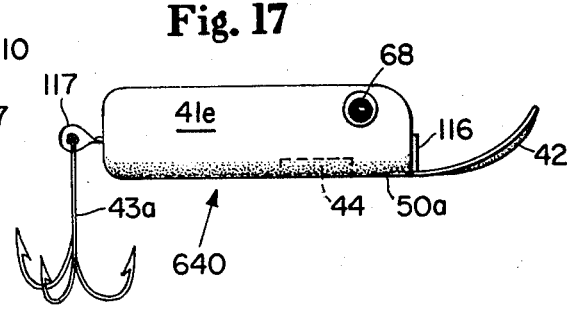
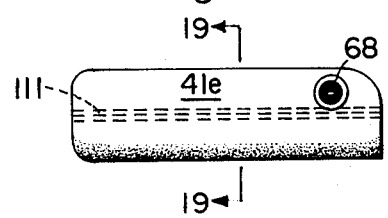
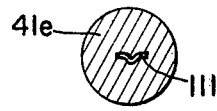
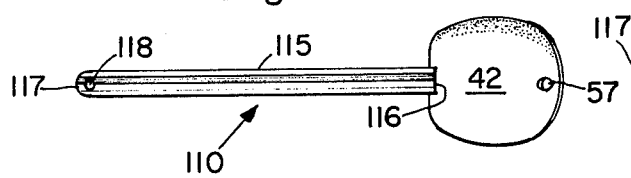
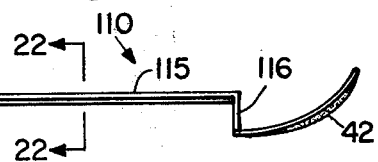

FISH LURE

FIELD OF THE INVENTION

This invention relates to providing a fish lure which will float in a body of water, and which will jump generally upwardly from the water when a forwardly acting force or force impulse is suddenly applied to the lure via a fish line. Such lures are particularly useful because, when they are caused to jump, they simulate small fish or frogs which jump from the water to catch flies, bugs and insects and the like.

BACKGROUND OF THE INVENTION

Fish lures having members extending forwardly from their head ends are disclosed, for instance, in U.S. Pat. No. 2,615,274 which issued Oct. 28, 1952 to P. F. Slough, and in U.S. Pat. No. 3,541,718 which issued Nov. 24, 1970 to B. K. Norman. Indeed, the Slough lure is described (Column 2, lines 26-28) as " . . . having a tendency to jump out of the water . . . ". However, as compared to the present invention the forwardly extending members of these fish lures are not cantilevered forwardly and upwardly from the bottom portion or bottom edge of a blunt nosed body as provided by the present invention. While this distinction is considered material, it is not believed to be the only material distinction between these prior art lures and the lures described hereinafter which embody the present invention.

Other prior art patents include U.S. Pat. No. 2,563,282 which issued Aug. 7, 1951 to J. N. Schenck and which discloses a fish lure comprising a skeletal-type interior structure and a rotationally adjustable head piece; U.S. Pat. No. 3,497,987 which issued Mar. 3, 1970 to G. S. Perrin and which discloses a fish lure having a somewhat scorpion-tail-shape hook; U.S. Pat. No. 3,762,088 which issued Oct. 2, 1973 to B. L. Bainton and which discloses a lure having a fin 34 which is somewhat similarly shaped to the keel fin of one embodiment of the present invention which is described hereinafter, but which fins are oppositely disposed and are believed to have substantially different functions; and U.S. Pat. No. 3,874,109 which issued Apr. 1, 1975 to C. A. Peterson and which shows a "Tease Spoon" having a plurality of fish line attaching apertures 22, and an adjustably positionable weight 36. However, while the lures disclosed in the above referenced patents comprise some similarities to the buoyant, jumping fish lure embodiments of the present invention as described and shown herein, it is believed they fail both individually and collectively to teach, disclose, or suggest the present invention, or means for achieving the degree of dynamic performance of lures embodying the present invention.

SUMMARY OF THE INVENTION

A buoyant fish lure having a substantially blunt-shape head end, a wing lip which is cantilevered forwardly and upwardly from the bottom portion of the head end, and provision for having a fish line rig attached to the lure so that the wing lip resolves a substantial portion of a generally forwardly acting, suddenly imposed force on the lure via the fish line rig into an upwardly acting force impulse. Thus, the lure can be caused to jump upwardly from a body of water in which it is disposed by suddenly applying a sufficiently great, generally forwardly acting force to the lure through a fish line rig.

BRIEF DESCRIPTION OF THE DRAWINGS

While the specification concludes with claims particularly pointing out and distinctly claiming the subject matter regarded as forming the present invention, it is believed the invention will be better understood from the following description in conjunction with the accompanying drawings in which:

FIG. 1 is a top view of a jumping fish lure which is a preferred embodiment of the present invention.

FIG. 2 is a side elevational view of the fish lure shown in FIG. 1 and disposed in a body of water.

FIG. 3 is a top view of an alternate fish lure embodiment of the present invention.

FIG. 4 is a side elevational view of the fish lure shown in FIG. 3.

FIG. 5 is a top view of another alternate fish lure embodiment of the present invention.

FIG. 6 is a side elevational view of the fish lure shown in FIG. 5.

FIGS. 7 through 9 are perspective, top, and side elevational views respectively of yet another alternate fish lure embodiment of the present invention.

FIG. 10 is a perspective view of still yet another alternate fish lure embodiment of the present invention.

FIGS. 11 through 13 are top, side elevational, and bottom views respectively of an adjustably weighted fish lure embodiment of the present invention.

FIGS. 14a and 14b are enlarged scale sectional views of alternate embodiments of the fish lure shown in FIGS. 11-13 which views are taken along line 14—14 of FIG. 12.

FIG. 15 is a greatly enlarged scale fragmentary view of a longitudinally extending snap together joint in the fish lure shown in FIGS. 11-13 which view is taken along line 15—15 of FIG. 12.

FIG. 16 is a top view of another alternate fish lure embodiment of the present invention.

FIG. 17 is a side elevational view of the alternate fish lure embodiment of the present invention shown in FIG. 16.

FIGS. 18 and 19 are side elevational and end views respectively of a body member of the fish lure shown in FIGS. 16 and 17.

FIGS. 20 and 21 are top and side elevational views respectively of the skeletal member of the fish lure shown in FIGS. 16 and 17.

FIG. 22 is an enlarged scale sectional view taken along line 22—22 of FIG. 21.

DESCRIPTION OF A PREFERRED EMBODIMENT

Referring now to FIGS. 1 and 2, fish lure 40 is a preferred embodiment of the present invention disposed in a body of water 45 having a surface 46. Lure 40 comprises a buoyant body 41, a wing lip 42, a duplex fish hook 43, and a weight 44.

The buoyant body 41, FIGS. 1 and 2, has a bottom side 50, a top side 51, a tail end 52, and a blunt-shape nose or head end 53 such as is somewhat characteristic of but not limited to the porpoise; a member of a small toothed whale of the genus Phocaena having a blunt rounded snout that does not form a projecting beak. The body 41 of a lure constructed in accordance with this invention comprised balsa wood. It is not intended, however, to thereby limit the present invention to balsa wood as the only material suitable for constructing the lure and providing buoyancy.

The wing lip 42 of fish lure 40, FIGS. 1 and 2, is a relatively thin, spoon-shape member which is cantilevered forwardly and upwardly from the portion of the head end 53 adjacent the bottom side 50 of body 41. The side profile of the wing lip 42 as shown in FIG. 2 is arcuate-shape. Also, wing lip 42 has sufficient length that its distal end extends above the normal water line of the lure (water surface 46). Wing lip 42 has a convex downwardly facing bottom surface 55, and a concave upwardly facing upper surface 56. An aperture 57 is provided in the distal end portion of wing lip 42. Aperture 57 provides means for conveniently and releasably attaching a fish line rig to fish lure 40. This is illustrated in FIG. 2 with a safety-pin-type clip 59 fastened to the wing lip 42 through aperture 57, and with a fish line 60 tied to clip 59.

Duplex fish hook 43 comprises a shaft 62, and two outwardly and upwardly and thence forwardly extending arcuate-shape arms 63 and 64 which terminate in forwardly pointing barbs 65 and 66 respectively. The duplex fish hook 43 is cantilevered from the tail end 52 of body 41 and preferably has its proximal end rigidly connected internally of body 41 (not shown) to the proximal end of wing lip 42 so that the body 41 does not have to be a high tensil strength structural link intermediate the wing lip 42 and the hook 43. As shown in FIG. 2, the geometry of hook 43 and its orientation with respect to body 41 causes the hook to have a somewhat scorpion-tail-shape.

Weight 44 is of sufficient mass and is so disposed in the bottom portion of body 41 that the lure will float relatively low in a body of water 45 as indicated in FIG. 2 by the surface 46 of the water being relatively high on the body 41, and so that the lure has only one stable orientation; that shown in FIG. 2.

As indicated in FIGS. 1 and 2, fish lure 41 can be given a fish like appearance by decorating it with eyes 67 and 68, and other fish appearance indicia such as scales (not shown). However, it is believed that providing such appearance indicia is not critical with respect to the present invention.

In use, as shown in FIG. 2, fish lure 40 floats low in the body of water 45, and the distal end of wing lip 42 extends above the surface 46 of water 45. A nominal amount of any suitable bait may be impaled on barbs 65 and 66 although such baiting is not believed to be critical to the present invention. However, in the event bait is used, care should be taken to use less than would impair the effectiveness of weight 44 with respect to providing lure 40 with only one stable orientation as described hereinbefore. That is, a great deal of bait could vitiate the stability of the lure and cause it to float upside down or to be totally unstable. This should be avoided because the effectiveness of the wing lip with respect to enabling the lure to jump from the water is believed to depend on the orientation shown in FIG. 2. When a generally forwardly acting force or force impulse as indicated by arrow 70 is suddenly applied to lure 40 via the fish line rig comprising clip 59 and fish line 60, the ski-tip shape of wing lip 42 functions to resolve a substantial portion of the force into an upwardly acting impulse which causes the lure to jump upwardly from the water in response to such a suddenly applied force of sufficient magnitude.

As used herein, a generally forwardly acting force is one which has a substantially larger horizontal component than its vertical component. Also, as used herein, a force impulse is that which results from a high rate of first increasing and then immediately decreasing the magnitude of an applied force. Of course, as is believed to be obvious to persons of ordinary skill in the art, the application of a force or a force impulse having a substantial vertical component would cause a floating fish lure to jump without the benefit of a force resolving wing lip as provided by the present invention and as embodied in fish lure 40.

ALTERNATE EMBODIMENTS

To avoid undue repetitious descriptions, the alternate embodiments of the present invention are generally described hereinafter by distinguishing them from the embodiment shown in FIGS. 1 and 2; fish lure 40. Also, substantially identical features and members and the like are identified by the same designators used with fish lure 40; and features and members and the like having similar functions as those identified with respect to lure 40 are identified by like designators having suffix letters added. Still further, except as otherwise stated hereinafter, the alternate embodiments are used and function in substantially the same manner as described with respect to lure 40.

A first alternate embodiment of the present invention is fish lure 140, FIGS. 3 and 4, which comprises a buoyant body 41a, a wing lip 42, means for having a fish hook attached to the body which means is exemplified by hook-eye 73, and a triple fish hook 43a which is pendulously secured to hook-eye 73. Lure 140 may further comprise a weight (not shown) having the same function as weight 44 of lure 40 described hereinabove. To prepare lure 140 for use, a fish line rig (such as clip 59 and fish line 60, FIG. 2) is attached to lure 140 through aperture 57. The lure 140 will then jump from a body of water in which it is floating in response to a sufficiently great, suddenly applied, generally forwardly acting force or force impulse as described in conjunction with lure 40.

Another alternate embodiment of the present invention is lure 240, FIGS. 5 and 6. Lure 240 comprises a body 41b, a wing lip 42b, a duplex fish hook 43b, and a buoyancy and orientation control weight (not shown) which is similar to and has the same function as described hereinbefore with respect to weight 44 of lure 40. As compared to lure 40, FIGS. 1 and 2, lure 140 has a fatter, more blunt body 41b, has a relatively longer wing lip 42b, and has its scorpion-tail-shape duplex fish hook 43b mounted so that its barbs 65 and 66 are above the back half of body 41b. Wing lip 42b is relatively longer so that when lure 140 is disposed in a body of water and weighted so that it is substantially submerged, the distal (forward end) portion of the wing lip will extend above the surface of the water.

FIGS. 7, 8, and 9 are perspective, top, and side elevational views respectively of yet another alternate embodiment of the present invention which is designated fish lure 340. Lure 340 comprises a buoyant body 41c, a wing lip 42, a triple fish hook 43a, a weight 44c, a hook-eye 73 and a strut 74 which has one end secured to the proximal portion of wing lip 42 and is cantilevered downwardly and somewhat fowardly therefrom. In this embodiment, a plurality of apertures 75 are longitudinally spaced along strut 74. The apertures 75, three in number as illustrated on strut 74, provide a plurality of fish line rig attaching means so that a forwardly acting force will tend to rotate the lure to raise the head end of the lure and, it is believed, thereby coact with wing lip 42 to cause the lure 340 to jump from a body of water in response to suddenly applying a generally forwardly acting force impulse to the lure via a fish line rig. The tendency for the lure 340 to so rotate increases as a function of the distance of the selected fish line rig attachment aperture 75 from its proximal end. Attaching the fish line rig to the aperture 75 disposed adjacent the distal (free) end of strut 74 will cause lure 340 to have more rotational response to forces applied via the fish line rig than when the rig is attached through the apertures 75 disposed closer to the proximal end of the strut 74; that is, disposed closer to the center of gravity of the lure which center of gravity is not identified in the figures. It is to be noted however that wing lip 42 of lure 340 also comprises aperture 57 for the convenience of users who prefer the simple jumping action described hereinbefore. That is, jumping action without the amplified rotational response which can be achieved by attaching the rig to strut 74.

FIG. 10 is a perspective view of an alternate embodiment fish lure 440 which is substantially similar to lure 340, FIGS. 7-9, except lure 440 has no strut 74. Rather, lure 440 has a longitudinally extending keel fin 80 disposed subjacent wing lip 42. A plurality of fish line rig attaching means, namely apertures 81, are longitudinally spaced along keel fin 80. This plurality of attachment apertures provide the user with means for adjusting the elevation at which fish line imposed force impulses are applied to lure 440. Thus, the dynamic response characteristics of lure 440 are selectable within the range provided by the plurality of apertures 81. For instance, the lowest aperture 81, the one disposed closest to body 41c, will provide the most rotational response of lure 440 while the aperture 81 disposed at the opposite end of keel fin 80 will provide the least rotational response of lure 440 to generally forwardly acting forces applied to the lure via a fish line rig attached to the lure through one of the apertures 81.

FIGS. 11 through 13 are top, side, and bottom views respectively of alternate embodiment fish lure 540. Fish lure 540 comprises a body 41d, wing lip 42, triple hook 43a, weight 44b, and hook-eye 73. As compared to lure 440, FIG. 10, lure 540 has a body 41d comprising a left hand 89 and a right half 90 which are provided with cooperating means for being snapped together along joints 91 and 92 as will be described more fully hereinbelow. The body halves 89 and 90 are provided with stubby wing like portions 93 and 94 respectively which cooperate in the assembled lure to provide a generally horizontally extending tail plane having a negative angle of attack as is shown in FIG. 12. The tail plane functions to amplify or add to the rotational response of the lure by causing the tail end to move downwardly as the wing lip causes the head end to move upwardly when the lure is subjected to a force as described hereinbefore.

The bottom of body 41d of lure 540 is provided with a recess 95, FIG. 12, in which weight 44b is longitudinally adjustably disposed. Weight 44b has a keel piece 96 to provide gripping means to enable the user to slide weight 44b forward or aft as desired. Keel piece 96 also provides anti-wiggle stability to the lure if it is disposed in moving water (e.g.: a river) or is used while trolling.

Weight 44b is longitudinally adjustable by virtue of having it interlocked in a longitudinally extending slot 97 provided in the bottom side of lure 540. This interlocking is shown in FIG. 14a which is a sectional view taken along line 14—14 of FIG. 12. That is, the weight 44b has a wasp waist 98 disposed intermediate its bulbous shape top and bottom portions. The wasp waist 98 has an intereference fit in slot 97. By virtue of the interference fit, the weight will stay where it is selectively positioned by the user. Alternatively, the edges of the slot and the waist portion of the weight can be provided with more positive interlocking means such as cooperating serrated portions (not shown) to provide further assurance the weight will not move except when being purposely adjusted. That is, such means provides greater assurance that the position of the weight will not be changed by, for instance, forces encountered during casting.

Referring again to FIG. 14a, the body halves 89 and 90 of lure 540 are provided with sealed cavities 101 and 102 respectively to provide flotation means for the lure.

FIG. 14b shows alternate embodiment body halves 89a and 90a which cooperate to provide the same functions (i.e., exterior appearance, slot 97 for adjusting weight 44b, and snap together assembly) as provided by body halves 89 and 90, FIGS. 11-13 and 14a, except the configuration shown in FIG. 14b has no flotation providing sealed cavities. Therefore, the body halves themselves or other members of the lure must comprise sufficient flotation means to enable lure 540 to float. Alternatively, such hollow body embodiments of the present invention can be filled with flotation providing means such as, but not limited to, cork or styrofoam (not shown).

FIG. 15 is a greatly enlarged scale sectional view of the top snap-together joint 91 intermediate body halves 89 and 90, which view is taken along line 15—15 of FIG. 12. The bottom snap-together joint 92 indicated by line 92 in FIG. 13 has the same geometry and therefore is not shown independently in the drawings.

Referring back to FIGS. 12 and 13, lure 540 has an alternate embodiment, longitudinally extending keel fin 80a disposed subjacent wing lip 42 adjacent the proximal end of wing lip 42. Keel fin 80a is provided with a plurality of apertures 81. Keel fin 80a and apertures 81 provide means for achieving selective fish lure dynamic response as discussed hereinabove with respect to fish lure 440, FIG. 10.

Still yet another alternate embodiment fish lure 640 is shown in FIGS. 16 and 17 to comprise a buoyant body 41e, a skeletal member 110, and a triple hook 43a, and weight 44.

Body 41e of lure 640 is shown in FIGS. 18 and 19 (side and end views respectively) to have a generally cylindrical shape that has a longitudinally extending passageway 111 all the way through it. As shown in FIG. 19, passageway 111 has a non-circular cross section for a purpose stated hereinafter.

Skeletal member 110 of lure 640 is shown in FIGS. 20 and 21 to comprise a wing lip 42, a shank portion 115, a riser portion 116 and a free end 117 having an aperture 118 through it to provide means for having a fish hook such as 43a secured thereto or engaged therewith. As shown in enlarged scale in FIG. 22, the cross sectional shape of the shank portion 115 is the same as the noncircular cross sectional shape of passageway 111 through body 41e, FIG. 19. These mating cross sections enable body 41e to be telescoped onto shank 115 to provide a predetermined, single orientation, anti-rotational fit so that the wing lip 42 has a fixed, predetermined orientation with respect to body 41e of lure 640. The riser portion 116 of the skeletal member 110 is sufficiently long as indicated in FIG. 17 to cause the bottom surface of the proximal portion of the wing lip 42 to be flush with the bottom side 50a of body 41e. After body 41e has been telescoped onto shank portion 115 so that the free end 117 extends from the tail end of the body, the free end is bent such as by being twisted to lock the body on the skeletal member as shown in FIGS. 16 and 17.

Lure 640, FIG. 17, is prepared for use by securing a fish line rig (e.g.: clip 59 and fish line 60) to it through the use of aperture 57, FIG. 16, all as described hereinbefore in conjunction with lure 40, FIGS. 1 and 2. Also, even greater dynamic lure response could be achieved by incorporating the strut 74 of lure 340, FIG. 7, or the keel fin 80 of lure 440, and/or the tail plane of lure 540, FIGS. 11 through 13, as described hereinbefore but which additional alternate embodiments are not shown in the figures because they would be unduly redundant.

While particular embodiments of the present invention have been illustrated and described, it will be obvious to those skilled in the art that various changes, modifications and combinations can be made without departing from the spirit and scope of the invention and it is intended to cover in the appended claims, all such changes, modifications and combinations that are within the scope of this invention.

What is claimed is:

1. A fish lure comprising a body, a wing lip, and means for having a fish hook secured to said lure, said body having a bottom side, a top side, a tail end, and a blunt-shape head end having a substantially flat vertically extending face, said wing lip being cantilevered forwardly and upwardly from the forward end of said bottom side of said body, said lure further comprising means for causing said lure to normally float when disposed in a body of water so that said bottom side faces downwardly and so that at least substantial portions of said body and said wing lip are disposed below the surface of said body of water, and means for attaching a fish line rig to said lure so that said wing lip will resolve a substantial portion of a generally forwardly acting force which is suddenly imposed on said lure via said fish line rig into an upwardly acting force impulse whereby said lure can be caused to jump from said water in response to suddenly applying a sufficiently great said generally forwardly acting force on said fish line rig.

2. The fish lure of claim 1 wherein said means for attaching a fish line rig to said lure are disposed adjacent the distal end of said wing lip.

3. The fish lure of claim 1 wherein said wing lip has an arcuate-shape profile and has a convex-shape downwardly facing bottom surface.

4. The fish lure of claim 1 wherein said wing lip has sufficient length that the distal end of said wing lip normally extends above the surface of said body of water.

5. The fish lure of claim 1 further comprising a strut which is cantilevered downwardly from adjacent the proximal end of said wing lip, said strut comprising said means for attaching a fish line rig to said lure.

6. The fish lure of claim 5 wherein said means for attaching a fish line rig to said lure comprises a plurality of apertures longitudinally spaced along said strut.

7. The fish lure of claim 1 further comprising a longitudinally extending keel fin disposed subjacent said wing lip, said keel fin comprising said means for attaching a fish line rig to said lure.

8. The fish lure of claim 7 wherein said means for attaching a fish line rig to said lure comprises a plurality of rig attachment points longitudinal spaced along said keel fin.

9. The fish lure of claim 1 further comprising a generally horizontally extending tail plane which plane is disposed adjacent said tail end of said body so that said tail plane has a negative angle of attack.

10. The fish lure of claim 1 further comprising a fish hook which is rigidly secured to said body so that its shaft extends rearwardly from said tail end, and so that the curved portion of said hook arcs upwardly and then forwardly whereby said hook assumes a scorpion-tail-shape.

11. The fish lure of claim 1 wherein said wing lip and said means for attaching a fish hook to said lure are integrated into a skeletal member which member is secured as a unit to said body.

12. The fish lure of claim 11 wherein said body has a longitudinally extending passageway through it, and said skeletal member comprises a shank portion intermediate said wing lip and said means for attaching a fish hook to said lure, said body being secured to said wing lip with said shank portion extending through said passageway through said body so that the free end of said shank portion is disposed adjacent said tail end, said free end being bent sufficiently to lock said body on said shank portion of said skeletal member.

13. The fish lure of claim 12 wherein said means for having a fish hook secured to said lure comprises an aperture through the portion of said shank portion disposed adjacent said tail end.

14. The fish lure of claim 12 wherein the cross sectional shapes of said passageway and said shank portion provide a predetermined, single orientation, anti-rotational fit of said shank portion in said passageway so that said wing lip has a predetermined orientation and disposition with respect to said body.

* * * * *